Aug. 26, 1969     P. PATZ     3,463,124
ENDLESS CONVEYOR CATTLE FEEDER
Filed Dec. 6, 1967     2 Sheets-Sheet 1
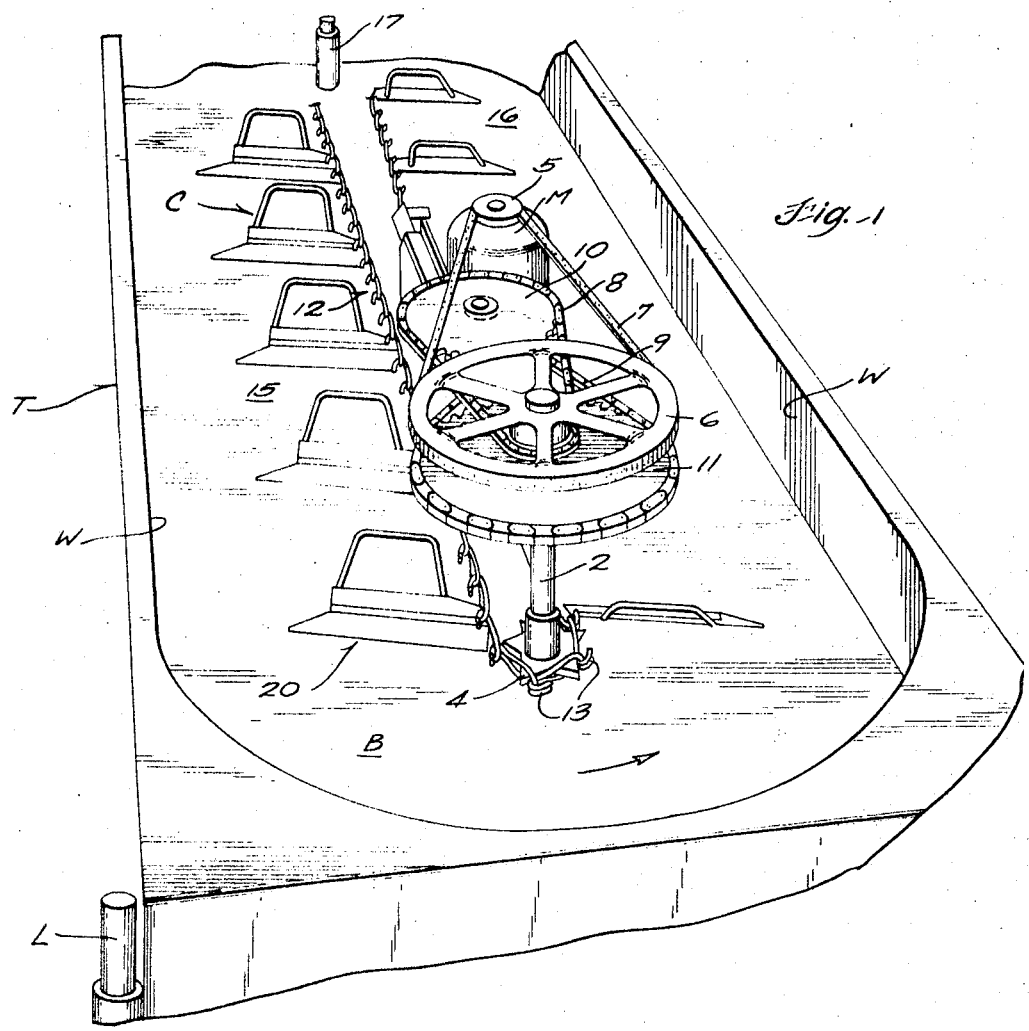
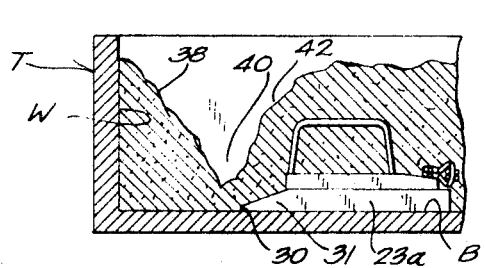
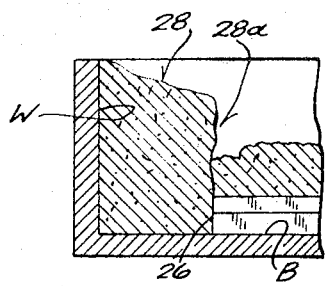
Inventor:
Paul Patz
By: James E. Nilles
Attorney Aug. 26, 1969   P. PATZ   3,463,124
ENDLESS CONVEYOR CATTLE FEEDER
Filed Dec. 6, 1967   2 Sheets-Sheet 2

Inventor:
Paul Patz
By: James E. Nilles
Attorney

United States Patent Office 3,463,124
Patented Aug. 26, 1969

3,463,124
ENDLESS CONVEYOR CATTLE FEEDER
Paul Patz, Pound, Wis. 54161
Filed Dec. 6, 1967, Ser. No. 688,611
Int. Cl. A01k 5/00; B65g 19/00
U.S. Cl. 119—52                              10 Claims

ABSTRACT OF THE DISCLOSURE

An endless conveyor which moves in a horizontal orbit in a feeding trough to distribute feed, such as hay and ensilage, around the trough where it is eaten by the cattle. The conveyor is formed of an endless chain having spaced flites extending outwardly therefrom, which flites have a generally pointed, triangular outer end which breaks up the otherwise compacted feed material in the trough.

Background of the invention

The invention pertains to endless type conveyors which move in a horizontal, orbital path in a feed trough. The conveyor has a series of laterally extending, material moving flites which are spaced apart from one another and move along the bottom of the trough. The flites have generally pointed outer ends which prevent packing of the material in the trough and are also formed to efficiently carry the material and maintain their proper position.

Prior art feed conveyors of this character have used flites with square or generally vertical ends which move along at a distance spaced from the outer wall of the trough. As a result, this prior art, as they continuously were pulled past the material, actually packed the material tightly against the outer wall into a very tight and compact mass. Furthermore, the feed material would sometimes collect or ball up in the area between the oppositely moving sides of the endless chain, thus, pushing the flites outwardly and against the compacted feed material located along the outer wall of the trough. The resulting binding action on the flites would not only cause the flites to bend and twist rearwardly, but even worse, the flites would be forced upwardly carrying with them the succeeding flites, resulting in complete malfunction and non-function of the feeder.

Summary of the invention

The present invention provides an endless, chain type, feed conveyor having a series of spaced apart, laterally extending feed moving flites which move over the bottom of a feed trough. The flites have generally pointed ends of a particular shape which prevent packing of the material against the outer wall of the trough and keep the material light and fluffy. The invention also provides flites for such a cattle feeder which are inclined rearwardly and upwardly in the direction of conveyor movement whereby the flites are held firmly against the bottom of the trough in proper feeding position; furthermore, the flites have an upwardly extending and generally open portion which is particularly effective and efficient in moving a maximum amount of fluffy feed material, such as hay, for the size of the flite.

Brief description of the drawings

FIGURE 1 is a perspective view of a portion of a bunk feeder for cattle which embodies the present invention;

FIGURE 6 is a vertical, cross-sectional view taken generally along line 6—6 in FIGURE 2, but on an enlarged scale;

FIGURE 7 is a view similar to FIGURE 6 but showing a prior art flite and the packed feed material which results therefrom.

Description of a preferred embodiment

Figure 2:
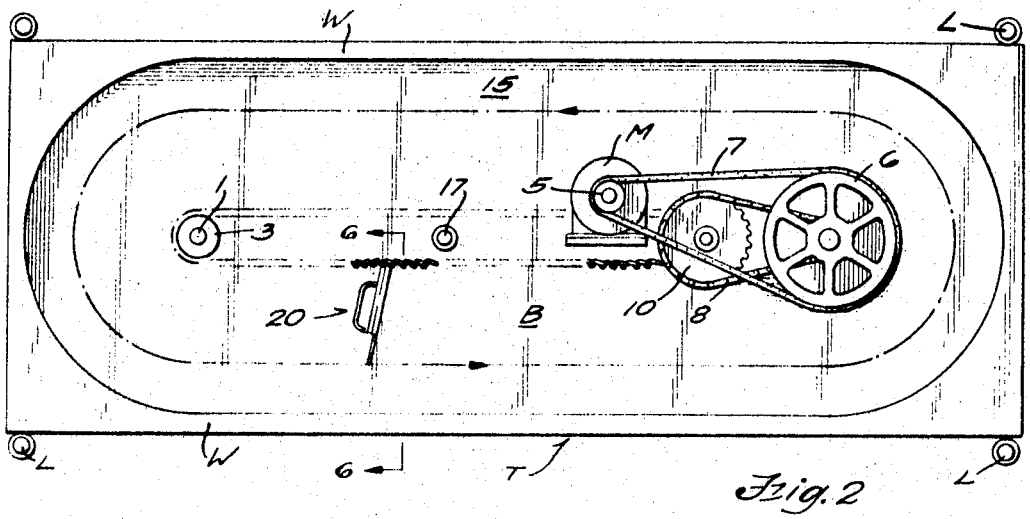
FIGURE 2 is a plan view of the feeder shown in FIGURE 1, but on a smaller scale.
Figure 3:
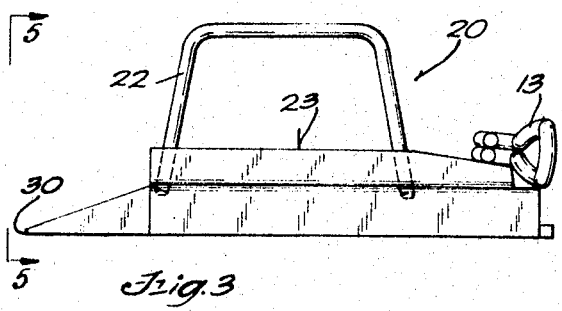
FIGURE 3 is a front, elevational view of one of the flites shown in FIGURES 1 and 2, but on an enlarged scale.
Figure 4:
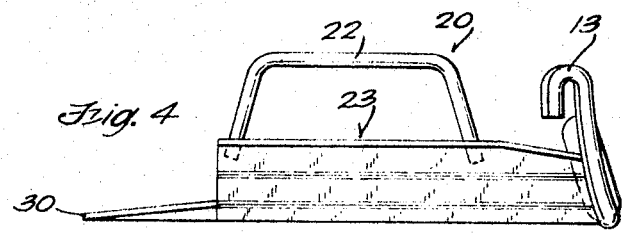
FIGURE 4 is a plan view of the flites shown in FIGURE 3.

The feed trough T is supported by legs L at a convenient height off the floor or ground, in order to permit the cattle to conveniently place their heads into the trough for feeding directly therefrom. This trough includes a bottom B and an outer, vertical wall W which extends around the outer side of the orbital path of the conveyor to be described.

At the ends of the trough, a vertical post 1 and 2 extend upwardly from the bottom B and an idler wheel 3 and a chain sprocket 4 are mounted on posts 1 and 2 respectively. Wheel 3 is an idler and may be rotatably journalled on post 1, while sprocket 4 is a drive sprocket fixed to the drive post 2. Post 2 is driven by an electric motor M in the conventional manner through suitable pulleys 5 and 6, belt 7, and speed reduction roller chains 8 and 9 and their associated sprockets 10 and 11.

The conveyor C includes an endless and flexible chain 12 comprised of a series of steel links 13, which links have an open portion 14 engageable by the sprocket 4. As a result, the motor drives the chain in its endless orbital path around the trough. The chain thus has oppositely moving side lengths 15 and 16, one on each side of the generally centrally disposed post 17 which extends upwardly from the trough bottom. Post 17 is necessary to keep the opposite side lengths of the endless chain from interferring with one another, that is, to keep them separated and prevent them from being entangled and jammed against one another, along with their flites, now to be described.

The flites 20 are welded at their inner ends to a chain link and extend generally outwardly and rearwardly (as shown in FIGURE 2) from the chain at the point of their attachment thereto.

The flites include an upper, open portion 22 which may be formed from a rod bent into the form of an inverted U and welded at its legs to the sheet steel portion 23 of the flite. The portion 23 is formed into three sections, front section 23a, a central and generally horizontal section 23b, and an upper and rearwardly inclined section 23c.

Figure 5:
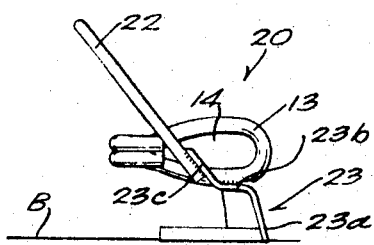
FIGURE 5 is an outer elevational view of the flites shown in FIGURE 3, the view taken generally along line 5—5 in FIGURE 3.

It will be noted from FIGURE 5, that the flite extends at an incline upwardly and to the rear in respect to the direction of its travel. As a result, when the flite is loaded with material and is being pulled along the trough, the weight of the material has a definite downward component of force holding the flite against the bottom B of the trough. Thus, the load on the flite not only tends to push it backward, but also hold the flite down, and this is important in feeders of this character.

The open, upper portion 22 of the flite serves to efficiently convey much more material than a similarly sized flite could ordinarily carry, particularly material such as haylage, that is hay types of feed which are relatively light, fluffy and bulky. The action of the open portion 22 on the hay is such that it catches the hay, that is, the latter wraps around or engages the portion 22, and as a result of volume of feed, extending over the top of portion 22, can be moved along the trough. Better conveying action results, in particular, when the conveyor moves around corners or the ends of the feeder trough.

As shown in FIGURE 7, the conventional flites of prior art devices were generally vertical or square, as indicated by reference numeral 26. The material 28, between the outer ends of the conventional flites and the outer wall of the trough, actually became very firmly packed by the continual pressing and wiping action of the flite ends. A vertical wall 28a of material would be formed which was extremely hard. The packed material 28 extended to the top of the wall W, located well above the flites. This compaction occurred to such an extent that the flites would bind severely against the material 28. This was particularly true when some of the material, which had been dumped into the trough, and located between the oppositely moving side lengths 15 and 16 of the chains, became "balled up," that is formed into an actual ball of material due to the opposite rolling action of the opposed chain sides 15 and 16. As these balls of material then became lodged against the central post 17, they forcibly caused the opposite sides of the conveyor to move outwardly in opposite directions against their respective and adjacent outer walls of the trough. This wedging action of the balled up material in the center of the conveyor caused not only severe binding of the flites against the solid mass 28 of material, but eventually caused the flites to lift up and ride over the top of the material, thereby causing the entire conveyor to raise up and become totally ineffective in its feed conveying action.

In accordance with another aspect of the present invention, the outer end of each flite is formed substantially as a point 30, more particularly the generally dull point 30 is located at the bottom edge of the flite and at the bottom of the trough. In other words, the end of the flite is formed generally as a triangle 31, and this triangular piece may be welded on the end of section 23a or formed integrally therewith.

The action of the generally pointed end of the flite is shown in FIGURE 6 and is such that it maintains the material 38 in a loose condition and does not permit or cause the material to become compacted. Instead, a V-shaped groove 40 has been found to be formed in the material just above the point 30.

With the maintaining of the material in a fluffy condition, as indicated at 42 in FIGURE 6, the flites do not bind, bend or raise up, and even and positive feeding action of the conveyor is assured.

I claim:

1. Livestock feeding mechanism comprising, a horizontally disposed feed trough having a bottom and an outer generally vertical wall which define a feed trough area from which cattle can feed, an endless chain conveyor generally centrally mounted within said trough for horizontal orbital movement therearound, said conveyor comprising an endless chain having oppositely moving side lengths, in the central portion of said trough, said conveyor also having a plurality of flites secured at spaced locations along the length of said chain and extending generally outwardly therefrom and terminating in a free end located a distance from said outer wall of said trough, said flites having a front section which terminates at said free end generally as a triangle having a laterally outwardly extending point located closely adjacent to said bottom, whereby the generally pointed end so formed at the free end of said flites acts to stir-up and maintain the material located between said wall and said flites in an unpacked condition; said flites also having a central and generally horizontal section, and an upwardly and rearwardly inclined section whereby a load on the flites tends to hold them down.

2. The mechanism as defined in claim 1 further characterized in that said flites have an upper portion which is open to thereby cause said feed to become entangled therewith.

3. The mechanism set forth in claim 2 further characterized in that said flites are inclined upwardly and rearwardly in respect to the direction of travel of said flites.

4. Mechanism as described in claim 2 wherein said upper portion is formed of a bent rod.

5. Livestock feeding mechanism comprising, a horizontally disposed feed trough having a bottom and an outer generally vertical wall which define a feed trough area from which cattle can feed, an endless chain conveyor generally centrally mounted within said trough for horizontal orbital movement therearound, said conveyor comprising an endless chain having oppositely moving side lengths, in the central portion of said trough, said conveyor also having a plurality of flites secured at spaced locations along the length of said chain and extending generally outwardly therefrom and terminating in a free end located a distance from said outer wall of said trough, said flites having a front section engageable with said trough bottom, a central and generally horizontal section, and an upper and rearwardly inclined section whereby a load on the flites tends to hold them down, said flites having an upper portion extending upwardly from said upwardly and rearwardly inclined sections which is open to thereby cause feed material to become entangled therewith.

6. Mechanism as described in claim 5 wherein said upper portion is formed of a bent rod.

7. The mechanism as set forth in claim 5 further characterized in that said flites are inclined upwardly and rearwardly in respect to the direction of travel of said flites.

8. Mechanism as described in claim 7 wherein said upper portion is formed of a bent rod.

9. Livestock feeding mechanism comprising, a horizontally disposed feed trough having a bottom and an outer generally vertical wall which define a feed trough area from which cattle can feed, an endless chain conveyor generally centrally mounted within said trough for horizontal orbital movement therearound, said conveyor comprising an endless chain having oppositely moving side lengths in the central portion of said trough, said conveyor also having a plurality of flites secured at spaced locations along the length of said chain and extending generally outwardly therefrom and terminating in a free end located a distance from said outer wall of said trough; said flites having a front section engageable with said trough bottom, a central and generally horizontal section extending from the upper edge of the said front section, and an upper and rearwardly inclined section extending from the rear edge of said generally horizontal section whereby a load on the flites tends to hold them down.

10. The mechanism set forth in claim 9 including an upper portion extending upwardly from said upper and rearwardly inclined section which is adapted to cause the material being conveyed to become entangled therewith.

References Cited

UNITED STATES PATENTS

| 2,544,191 | 3/1951 | Tomfohrde | 198—171 |
| 2,389,279 | 11/1945 | Sinden | 198—176 |
| 2,762,494 | 9/1956 | Aasland | 198—171 |

FOREIGN PATENTS

| 1,016,190 | 1/1966 | Great Britain. |
| 1,196,198 | 5/1959 | France. |
| 1,247,945 | 8/1967 | Germany. |
| 1,456,338 | 11/1965 | France. |

RICHARD E. AEGERTER, Primary Examiner

U.S. Cl. X.R.

198—171

Disclaimer 3,463,124.—*Paul Patz*, Pound, Wis. ENDLESS CONVEYOR CATTLE FEEDER. Patent dated Aug. 26, 1969. Disclaimer filed Apr. 1, 1970, by the assignee, *Patz Company*.

Hereby enters this disclaimer to claim 9 of said patent.

[*Official Gazette December 1, 1970.*]